US012801154B2

(12) United States Patent
Ams et al.

(10) Patent No.: US 12,801,154 B2
(45) Date of Patent: Nov. 17, 2026

(54) LOADING AND UNLOADING A LOADING SPACE BY A LOADING TRUCK

(71) Applicant: SICK AG, Waldkirch (DE)

(72) Inventors: Mathias Ams, Waldkirch (DE); Eduard Mosgalewsky, Waldkirch (DE); Fabricio Faccini, Waldkirch (DE)

(73) Assignee: SICK AG, Waldkirch (DE)

( * ) Notice: Subject to any disclaimer, the term of this patent is extended or adjusted under 35 U.S.C. 154(b) by 317 days.

(21) Appl. No.: 18/616,658

(22) Filed: Mar. 26, 2024

(65) Prior Publication Data

US 2024/0343510 A1 Oct. 17, 2024

(30) Foreign Application Priority Data

Apr. 17, 2023 (EP) .................................... 23168191

(51) Int. Cl.
*G05D 1/633* (2024.01)
*G05D 1/242* (2024.01)
(Continued)

(52) U.S. Cl.
CPC ............. *G05D 1/633* (2024.01); *G05D 1/242* (2024.01); *G05D 1/249* (2024.01); *G05D 1/667* (2024.01)

(58) Field of Classification Search
CPC ................ B60R 1/27; B60R 2300/105; B60R 2300/303; B60R 2300/607; G01C 17/30; G01C 17/38; G01C 17/28; G01C 21/3407; G06T 3/4038; G06T 11/60; G06V 20/56; G06V 20/58; G06V 20/588; H04N 23/45; H04N 23/90; E04H 6/12; E04H 6/287; E04H 6/40; E04H 6/424; E04H 6/282;
(Continued)

(56) References Cited

U.S. PATENT DOCUMENTS 3,934,739 A * 1/1976 Zumsteg .................. B60P 1/64
414/919
10,815,080 B2 * 10/2020 Anderson .............. B65G 67/02
(Continued)

FOREIGN PATENT DOCUMENTS

DE 102019128782 A1 4/2021
EP 3859382 A1 8/2021

OTHER PUBLICATIONS

German Search Report dated Oct. 9, 2023 corresponding to application No. 23168191.7.

*Primary Examiner* — Daniel Previl
(74) *Attorney, Agent, or Firm* — Nath, Goldberg & Meyer; Jerald L. Meyer

(57) ABSTRACT

A method of loading and/or unloading a loading space is provided having a loading vehicle that drives into the loading space at least once to place down and/or to collect at least one load object, wherein an access zone of the loading space is safeguarded by at least one first sensor and the loading vehicle is safeguarded by at least one second sensor, In this respect, on driving into the loading space, the loading vehicle first drives to a first position that is so close to the safeguarded access zone that no person fits between the loading vehicle and the safeguarded access zone and the safeguarding of the access zone is then adapted by the first sensor such that a drive-through corridor for the loading vehicle is created.

21 Claims, 5 Drawing Sheets

Figure 1:
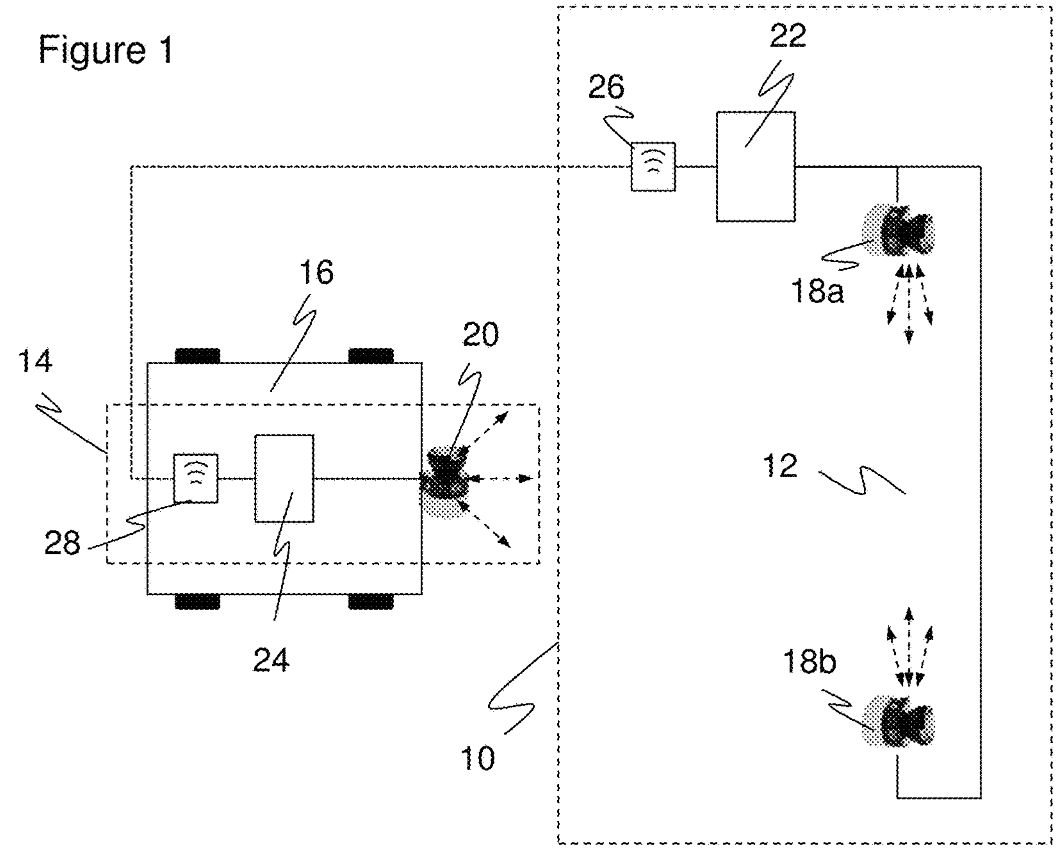

(51) Int. Cl.
*G05D 1/249* (2024.01)
*G05D 1/667* (2024.01)

(58) Field of Classification Search
CPC ..... B60B 21/02; B60B 21/023; B60B 21/026; B60B 21/10; B60B 21/102; B60B 2900/111; B60B 2900/131; B60B 2900/133; B60B 2900/311; B60B 2900/521; B60B 3/00; B60K 2006/4825; B60K 6/48; B60K 2360/685; B60K 2360/782; B60K 35/10; B60K 35/23; B60K 35/29; B60K 35/53; B60K 35/60; B60K 35/65; B60K 37/20; B60W 10/06; B60W 10/08; B60W 20/11; B60W 20/15; B60W 20/20; B60W 2050/0082; B60W 2420/403; B60W 2552/00; B60W 2552/30; B60W 2555/20; B60W 2710/244; B60W 2720/125; B60W 2720/28; B60W 30/143; B60W 30/182; B60W 40/1005; B60W 40/13; B60W 50/0098; B60W 2556/10; B60W 40/08; B60W 50/0097; B60W 50/14; B60W 60/0013; B62D 6/00; B62D 6/007; G01L 19/00; G01M 17/007; G01M 99/008; G01N 2021/551; G01N 21/55; G06Q 50/40; G06Q 10/02; G06Q 10/04; G06Q 10/047; G06Q 10/063; G06Q 10/08; G06Q 10/0833; G06Q 10/20; G06Q 30/06; G06Q 10/30; G07C 5/0816; G07C 5/085; G07C 5/0808; Y02T 10/62; Y02T 10/86; A62C 3/002; A62C 35/68; B60L 53/62; B60L 53/66; G05D 1/242; G05D 1/249; G05D 1/633; G05D 1/667; G05D 2105/28; G05D 2107/95; G05D 2109/10; G05D 2111/17; G06N 20/00; G06N 5/04; G06N 3/08; G06N 5/01; G06N 7/01; G07F 11/00; G07F 11/04; G07F 11/16; G07F 17/0057; H02H 3/087; H02P 1/04; G21C 11/06; G21C 11/08; G21C 13/02; G21C 13/024; G21C 13/028; G21C 15/243; G21C 19/02; G21C 3/32; G21C 3/3408; G21C 3/38; G21C 5/02; G21C 5/06; Y02E 30/00; Y02E 30/30; A61B 2218/002; A61B 1/00006; A61B 1/00009; A61B 1/00011; A61B 1/00048; A61B 1/0005; A61B 1/00149; A61B 1/0016; A61B 1/04; A61B 1/046; A61B 1/0638; A61B 17/00; A61B 17/07207; A61B 17/320068; A61B 18/12; A61B 18/1206; A61B 18/14; A61B 2017/00017; A61B 2017/00115; A61B 2017/00199; A61B 2017/00203; A61B 2017/00207; A61B 2017/00216; A61B 2017/00221; A61B 2017/00225; A61B 2017/00398; A61B 2017/00734; A61B 2017/07257; A61B 2017/07285; A61B 2018/00702; A61B 2018/00994; A61B 2018/1253; A61B 2018/126; A61B 2034/2048; A61B 2034/2051; A61B 2034/2055; A61B 2034/2059; A61B 2034/2063; A61B 2034/2065; A61B 2034/2072; A61B 2034/252; A61B 2034/254; A61B 2034/258; A61B 2090/064; A61B 2090/364; A61B 2090/365; A61B 2090/371; A61B 2090/372; A61B 2090/373; A61B 2090/502; A61B 2218/007; A61B 2218/008; A61B 2562/0223; A61B 34/10; A61B 34/20; A61B 34/25; A61B 34/30; A61B 34/32; A61B 34/37; A61B 8/06; A61B 90/08; A61B 90/30; A61B 90/361; A61B 90/37; A61B 90/90; A61B 90/96; A61B 90/98; A61B 17/00491; A61B 17/0057; A61B 17/12022; A61B 17/12118; A61B 17/12181; A61B 17/3468; A61B 18/02; A61B 18/04; A61B 18/1492; A61B 18/18; A61B 18/245; A61B 2017/00411; A61B 2017/00544; A61B 2017/0065; A61B 2017/00809; A61B 2017/00876; A61B 2017/1205; A61B 2017/22001; A61B 2018/00005; A61B 2018/00023; A61B 2018/00345; A61B 2018/00517; A61B 2018/00541; A61B 2018/00577; A61B 2018/00595; A61B 2018/00982; A61B 2018/1861; G05B 13/0265; G06F 13/4068; G06F 16/211; G06F 16/284; G06F 16/285; G06F 21/6245; G06F 3/011; G06F 3/14; G06F 3/1423; G06F 3/167; G06F 40/169; G06F 9/4881; G06F 9/542; G08B 5/22; G10L 15/22; G10L 2015/223; G16H 10/60; G16H 15/00; G16H 20/40; G16H 30/20; G16H 30/40; G16H 40/20; G16H 40/40; G16H 40/63; G16H 40/67; G16H 50/20; G16H 50/30; G16H 50/70; G16H 70/20
USPC ............. 340/435, 932.2, 933, 426.1, 426.15, 340/426.26, 431, 438, 441, 463, 472, 517, 340/534, 527, 539.15
See application file for complete search history.

(56) References Cited

U.S. PATENT DOCUMENTS

| | | | | |
|---|---|---|---|---|
| 2008/0189166 | A1* | 8/2008 | Brooks ................ | G06Q 50/265 705/325 |
| 2008/0213067 | A1* | 9/2008 | Jegers .................. | B65G 63/004 414/803 |
| 2014/0089015 | A1* | 3/2014 | Stefik ..................... | G06Q 10/08 705/5 |
| 2014/0139360 | A1* | 5/2014 | Vilajosana Guillen ...................... | G08G 1/142 340/932.2 |
| 2015/0217693 | A1* | 8/2015 | Pliefke ................... | H04N 7/183 348/118 |
| 2018/0111769 | A1* | 4/2018 | Yuvaraj ...................... | B25J 5/00 |
| 2018/0194575 | A1* | 7/2018 | Anderson .............. | B65G 67/02 |
| 2020/0089973 | A1* | 3/2020 | Efland ............. | B60W 60/00253 |

* cited by examiner

LOADING AND UNLOADING A LOADING SPACE BY A LOADING TRUCK

The invention relates to a method of loading and/or unloading a loading space by a loading truck and to a safeguarding system for the loading and/or unloading of a loading space by a loading truck.

The loading and unloading of a truck or its trailer at a loading dock (truck loading) has hitherto taken place manually using a manned forklift truck. It is here the responsibility of the forklift operator to watch out for persons and to avoid accidents. Autonomous vehicles are admittedly used in the logistics sector that would generally also be able to take over the loading and unloading or would at least unable a mixed operation between manual and automated operation. However, there is a lack of a solution to ensure that no person is located in the trailer during the loading and unloading procedure. In other automated applications in logistics, autonomous vehicles only work in zones closed off for persons. This cannot be implemented at a loading dock.

Autonomous vehicles already monitor their travel with sensors to avoid accidents. A protected field is monitored in the direction of travel for this purpose, for example. If an object is recognized in the protected field, a hazard situation is assumed and the vehicle is braked. Electrosensitive sensor principles are used for this purpose. Sensors used in accident avoidance or in safety technology have to work particularly reliably and must therefore satisfy high safety demands, for example the standard IEN SO 13849 for safety of machinery and the machinery standard EN/IEC 61496 for electrosensitive protective equipment (ESPE). To satisfy these safety standards, a series of measures have to be taken such as a safe electronic evaluation by redundant, diverse electronics, functional monitoring or monitoring of the contamination of optical components.

Conventional protected field monitoring, however, does not work in a trailer. The load is packed very tightly and without empty spaces for economic reasons. With protected field monitoring, it is typically only determined whether the protected field is free of objects. This would as good as never be the case within the trailer so that the vehicle practically no longer comes out of standstill. There have already been approaches to differentiate between permitted and unpermitted objects in a protected field; however, in particular under said tight storage conditions, today's sensor systems are not able to reliably distinguish between persons and the load.

U.S. Pat. No. 10,815,080 B2 discloses an automatic loading and unloading system for trucks that plots an optimized arrangement of the load and controls autonomous vehicles accordingly. However, the document does not look at safety aspects.

Other conventional approaches are based on specific installations in the load zone, for example with conveying systems. It is thus known to prepare the total load outside the truck or trailer in the correct arrangement and then to move it as a whole. This procedure is thus restricted to a specific load infrastructure and safety is again initially not considered and must accordingly be additionally and independently ensured.

So called safe points of interest are presented in DE 10 2019 128 782 A1. They are positions that a movable machine identifies with the aid of a localization system and at which a safety function of a safety system of the movable machine is switched over. In the case of DE 2019 128 782 A1, the localization system is based on a distance sensor and a contour recognition unit. The safe points of interest are, however, not put into any relation with loading and unloading.

A method of localizing a person or an object in a monitored zone using a safety system is known from EP 3 859 382 A1. It is based on a radio location system having a plurality of radio stations that detect radio transponders on the person or object. A spatially resolving sensor is additionally provided for position determination. Safe position data are detected by a comparison of the position data of the radio location system and the spatially resolving sensor. This position determination is described without any connection to loading and unloading.

It is therefore the object of the invention to simplify the loading and/or unloading of a loading space by a loading vehicle.

The invention is satisfied by a method of loading and/or unloading a loading space by a loading vehicle and by a safeguarding system for the loading and/or unloading of a loading space by a loading vehicle in accordance with the respective independent claim. A loading space is, for example, a region closed by walls and therefore only accessible through an access zone, in which region products or other objects called load objects are stored, preferably for transport as in the case of a container, a semi-trailer, or a trailer. A loading vehicle drives into the loading space at least once, as a rule repeatedly multiple times, for this purpose, to place and/or pick at least one load object. The loading vehicle is preferably an autonomous vehicle such as an AGV (automated guided vehicle) or an AMR (autonomous mobile robot). The load vehicle can alternatively still be operated by an operator. The operator is then automatically protected by the invention from possible accidents with persons or other objects in his work zone.

The access zone that represents the only possibility of accessing the loading space is safeguarded by at least one first sensor. The safeguarding by the first sensor will at times be called a stationary safeguarding in the following. The loading truck itself is safeguarded by at least one second sensor. The safeguarding by the second sensor is correspondingly called a mobile safeguarding. The stationary and mobile safeguarding together make provision that the loading vehicle does not collide with unexpected objects during the loading and unloading and in particular that accidents with personal injury are avoided.

The invention starts from the basic idea that stationary safeguarding and mobile safeguarding complement one another and together ensure an automated, accident free operation. A critical moment comprises the stationary safeguarding for the loading vehicle having to remain open without this being able to be used intentionally or unintentionally by persons to enter into the travel path of the loading vehicle or into the loading space unnoticed. For this purpose, in accordance with the invention, a first position of the loading vehicle is defined in that it is located very close to the safeguarded access zone. A person does not fit between the loading vehicle and the safeguarded access zone in the first position. This is oriented on anthropometric dimensions, with a body typically being at least larger than, for example, 20 cm, 30 cm, 50 cm, or 70 cm in the cross-sectional dimensions of relevance here. The first position is first only defined in one dimension to fix a distance from the safeguarded access zone. In later embodiments, a second lateral dimension can be added.

The loading vehicle first drives to the first position on driving into the loading space. The safeguarding of the access zone by the first sensor is subsequently adapted such that a drive-through corridor for the loading vehicle is provided. In other words a partial muting takes place in the stationary safeguarding that makes it possible for the loading vehicle to drive through the safeguarded access zone into the loading space. Since the first position is so close to the access zone, no person can penetrate into the drive-through corridor unnoticed.

The invention has the advantage that an automated loading and loading is made possible that takes account of the safety aspects. Unlike previous approaches, it is thus no longer necessary to block the entire activity zone of the loading vehicle for persons. Beside shifting the responsibility onto the forklift operator, this is the previous way of avoiding accidents. To prevent the access of persons overall, however, an expensive and complex infrastructure having a plurality of components and corresponding space requirements is necessary. In addition, this considerably limits the flexibility of the logistic processes and is prone to disruption. The invention does not have these disadvantages. Persons may dwell in the environment and, for example, intervene on impending disruptions in good time or can carry out supplementary worksteps. Accidents cannot occur thanks to the invention.

The first sensor preferably recognizes the presence of an object in the access zone. The access zone should be non-penetrable except for the exceptional situation of the loading vehicle in the drive-through corridor; at least objects should not penetrate unrecognized. The second sensor preferably recognizes the presence of an object in front of the loading vehicle. Collisions during the travel of the loading vehicle should thereby be avoided; objects in the direction of travel are therefore above all of interest. Objects in different directions can additionally be detected to, for example, avoid accidents on a change of direction of the loading vehicle or to deal with situations such as a person jumping in front of the loading vehicle from the side. A safety response of the loading tool is preferably initiated on recognition of the presence of an object. If the mobile safeguarding has recognized an object, the possible danger is obvious. An object recognized by the stationary safeguarding means that objects may be present in zones where the mobile safeguarding is not prepared for it, in particular in the loading space. The stationary safeguarding therefore preferably also triggers a safety response on recognition of the presence of an object in the access zone. Depending on the safety concept, the loading vehicle can, for example, be stopped, can carry out an evasion movement, or can be decelerated to a safe slow speed of, for example, less than 0.3 m/s. The safety response can be accompanied or announced by an optical or acoustic warning signal.

The loading space is preferably a semi-trailer or a trailer of a commercial vehicle or of a truck. The loading and/or unloading thus relates to the scenario explained in the introduction, wherein the access zone is preferably arranged at a loading dock. The loading vehicle drives, for example, to and fro between a logistics zone and the semi-trailer and trailer. The load is preferably first prepared in two steps in the vicinity of the loading dock and is then loaded, with the loading procedure in accordance with the invention then relating to the second step between the loading dock and the loading space.

The loading vehicle preferably drives through the drive-through corridor into a second position that is located so close to the safeguarded access zone that no person fits between the loading vehicle and the safeguarded access zone and the drive-through corridor is then closed and the safeguarding of the access zone by the first sensor is thus again fully activated. The access zone is thus behind the loading vehicle in the second position, again so closely that it is not possible for a person to use the drive-through corridor unnoticed. For when the drive-through corridor is now closed again in the second position, a person located therein would be recognized by the stationary safeguarding and the space between the loading vehicle and the drive-through corridor is not sufficient for an easy unnoticed slipping through into the loading space. After these steps, the loading vehicle is located in the loading space, the access zone is non-penetrable again, and it is ensured that only the loading vehicle has passed through the safeguarded access zone.

The loading vehicle preferably first drives io the second position on driving out of the loading space, and then the safeguarding of the access zone by the first sensor is adapted such that a drive-through corridor for the loading vehicle is provided. The loading vehicle subsequently preferably drives through the drive-through corridor into the first position and the drive-through corridor is then closed and the safeguarding of the access zone by the first sensor is thus again fully activated. The drive-through corridor thus opens exclusively for the loading vehicle; there is not sufficient room for a person at any time to use the drive-through corridor unnoticed. When driving out, the steps on the driving in are to a certain extent repeated with swapped over roles of the first and second positions. However, differences result in the preferred activity of the mobile safeguarding as explained below.

A lateral position of the drive-through corridor is preferably adapted to a lateral position of the loading vehicle. A detection is thus made of where the loading vehicle is in the lateral direction in front of the access zone and the drive-through corridor opens just in front of the loading vehicle. In this embodiment, the first and second positions are only defined one-dimensionally as a distance from the access zone; the second lateral spatial dimension or transversely to the distance is dynamically processed. Alternatively, the drive-through corridor can only be provided at a fixed, now two-dimensionally defined first position or second position that is then correspondingly to be driven to by the loading vehicle while observing the lateral position. Such a drive-through corridor can in particular be prepared as a predefined protected field configuration to which the stationary safeguarding is switched for and during the driving through. It is furthermore possible to provide a plurality of first and/or second positions whose lateral coordinates differ from one another, that is a kind of intermediate step from fixed first and second positions to a fully dynamic consideration of the lateral position of the loading vehicle.

The safeguarding of the loading vehicle by the second sensor is preferably inactive during the movement in the loading space. It is ensured by the procedure in accordance with the invention that no person can have entered the loading space. The loading vehicle can thus act within the loading space without considering possible accidents with moving objects or persons. The requirement for this is that no persons are present in the loading space at the beginning on the activation of the stationary safeguarding. However, checking this, for example by the operator of a truck on the preparation and opening of a trailer, is a standard requirement on putting a safety application into operation.

The safeguarding of the loading vehicle by the second sensor preferably becomes inactive on the driving into the loading space at the earliest from the first position onward and is switched to active again on the driving out of the loading space up to the second position at the latest. The mobile safeguarding is not required from the first position onward on the driving in and up to the second position on the driving out because the stationary safeguarding ensures that no persons cross the travel paths of the loading vehicle. The switchover preferably takes place exactly at the first position when driving in and exactly at the second position when driving out so that the mobile safeguarding does not work unnecessarily redundantly to the stationary safeguarding and an unnecessary safety response is already triggered, for example, by a load object in the entrance zone of the loading space. When driving out, the mobile safeguarding already has to become active at the second position since a person could stand directly in front of the access zone where the stationary safeguarding does not detect them.

The loading vehicle preferably recognizes when it moves in a safety related zone in front of the access zone and then switches the safeguarding by the second sensor active at the latest. The zone in front of the access zone, in particular the zone of a loading dock, is to be considered safety related (confined), It is actually not required in accordance with the invention to preclude persons from being located here by additional measures, for example an operator of the truck or an employee putting the stationary safeguarding int operation for a respective loading/unloading procedure. The mobile safeguarding should therefore be active. A blocked zone for persons may in contrast by all means be configured further to the interior, for example in a logistics hall from where the load objects are collected or to where they are taken. Such zones are then not safety related from the point of view of the loading vehicle and a mobile safeguarding can be dispensed with there. The recognition of the safety related zone and the switchover can in particular be implemented by means of safe points of interest in accordance with DE 10 2019 128 782 A1 named in the introduction.

The cross-section of the drive-through corridor preferably corresponds to the cross-section of the loading vehicle, at least except for a buffer zone smaller than a person. The drive-through corridor is thus only just so large that the loading vehicle fits through and no person can move unnoticed into the loading space. In this respect, a certain margin or a buffer zone is permitted so that even small defective controls of the loading vehicle do not result in a detection by the stationary safeguarding. Such a buffer zone, however, remains too small for a person, with the dimensions of a possible buffer zone having to be fixed in a similar manner to the distances of the first and second positions from the safeguarded access zone.

A stationary safeguarding system of the access zone by the first sensor and a mobile safeguarding system of the loading vehicle by the second sensor are preferably in communication connection with one another. The loading vehicle can thus in particular request an opening and closing of the drive-through corridor and preferably receive respective acknowledgments thereof. A further application of the communication connection not named as exclusive comprises the mobile safeguarding system thus being able to become aware of when the stationary safeguarding system has detected an object. It is no longer ensured in this case that the loading space is free of persons and the loading vehicle has to adapt its further activities accordingly; for example, it may only work at a safe slow speed or must come to a full stop where necessary. Since safety related information are at least partially exchanged between the stationary and mobile safeguarding systems, functionally safe communication must preferably be ensured, in particular by corresponding protocols.

The first sensor for safeguarding the access zone preferably monitors an upright, in particular vertical, protected field. The term protected field has historical origins to a certain extent and can designate a protected volume, that is a three-dimensional zone. The upright protected field so-to-say acts as a virtual wall that closes the loading space, with this wall being able to have a certain inclination. The upright protected field is preferably monitored by more than one first sensor to implement different perspectives, for example by a respective first sensor at both sides of the access zone. A person in the shadow of the loading vehicle would otherwise remain unrecognized when it drives through so that an additional first sensor from the opposite direction preferably helps out here. Alternatively, a sensor can be used from a bird's eye view; shading effects are then possibly tolerable depending on the specific geometry.

The second sensor for safeguarding the loading vehicle preferably monitors an in particular horizontal protected field in the direction of travel. The mobile safeguarding is therefore based on a protected field monitoring. The protected field extends at least in the direction of travel and is preferably oriented at least approximately in parallel with the floor. Alternatively, there can be compartments of protected fields of different inclinations, with then protected field infringements by the floor preferably being recognized and filtered. The protected field or at least one further protected field can safeguard in a wide angle toward the front and can also consider lateral or even rear zones. Protected field safeguarding systems of a vehicle are known per se so that a suitable protected field configuration and, for example, an adaptation to the speed of the loading vehicle will not be looked at in any more detail.

The protected field of the second sensor is preferably successively shortened on the approach to the access zone. The protected field of the mobile safeguarding is adapted such that when a person is detected, it is possible to respond or to brake in good time. From a certain approach to the first position onward when driving into the loading space, such a protected field already projects into the zone that the stationary safeguarding anyway makes inaccessible. This monitoring is redundant and can result in unnecessary safety responses, for example due to objects in the entrance zone of the loading space. This can be prevented in that the protected field of the mobile safeguarding is shortened, preferably just so that it respectively ends at the access zone. A switching inactive of the mobile safeguarding in the first position is thus accompanied by a continuous transition with a shortening of the protected field, with the switching inactive being able to be understood as a shortening to a length of zero.

The first sensor and/or the second sensor is preferably one of the following: a single layer or multilayer laser scanner, a LiDAR sensor, a 3D camera, in particular a time of flight camera, a radar, or a radio location system, the latter in particular an ultrabroadband system, as is described in EP 3 859 382 A1 named in the introduction. On a use of a radio location system, the loading vehicle or persons is/are preferably equipped with a radio transponder. The selection possibilities for the sensors are given for the stationary safeguarding and for the mobile safeguarding, with a different selection being able to be made, for example the access zone can be safeguarded by laser scanners and the loading vehicle can be safeguarded by a camera or a radar. The sensors are preferably safe sensors. Safe and safety mean, as in the total description, that measures are taken to control errors up to a specific safety level or to observe regulations of a relevant safety standard for machine safety or for electrosensitive protective equipment, of which some have been named in the introduction. Unsafe is the opposite of safe and accordingly said demands on failsafeness are not satisfied for unsafe devices, transmission paths, evaluations, and the like.

The loading vehicle is preferably safely localized, at least in the first position and/or in the second position. The loading vehicle can optionally be safely localized at further positions up to the entire loading and unloading zone and beyond. In particular positions can be recognized for this purpose as safe points of interest in the sense of DE 10 2019 128 782 A1 named in the introduction.

The method is at least a computer implemented method, with respect to the safeguarding and preferably also to an autonomous control of the loading vehicle, that runs, for example, on a processing unit of the mobile and/or stationary safeguarding or of a superior system.

The safeguarding system in accordance with the invention for the loading and/or unloading of a loading space by a loading vehicle has a first sensor system for safeguarding an access zone of the loading space and a second sensor system for safeguarding the loading vehicle, wherein the two sensor systems can furthermore also be called a stationary or mobile safeguarding system or also as stationary and mobile electrosensitive protective equipment. The safeguarding system is configured to provide a drive-through corridor for the loading vehicle in the first sensor system when the loading vehicle has driven to a first position on the driving into the loading space, with said first position being so close to the safeguarded access zone that no person fits between the loading space and the safeguarded access zone. It is initially not fixed whether a corresponding control and evaluation functionality is to be associated with the first sensor system, the second sensor system, and/or a superior system, with a communication connection preferably being present to exert such roles in a distributed manner. The safeguarding can take place in accordance with one of the explained embodiments of the method in accordance with the invention.

Figure 2:
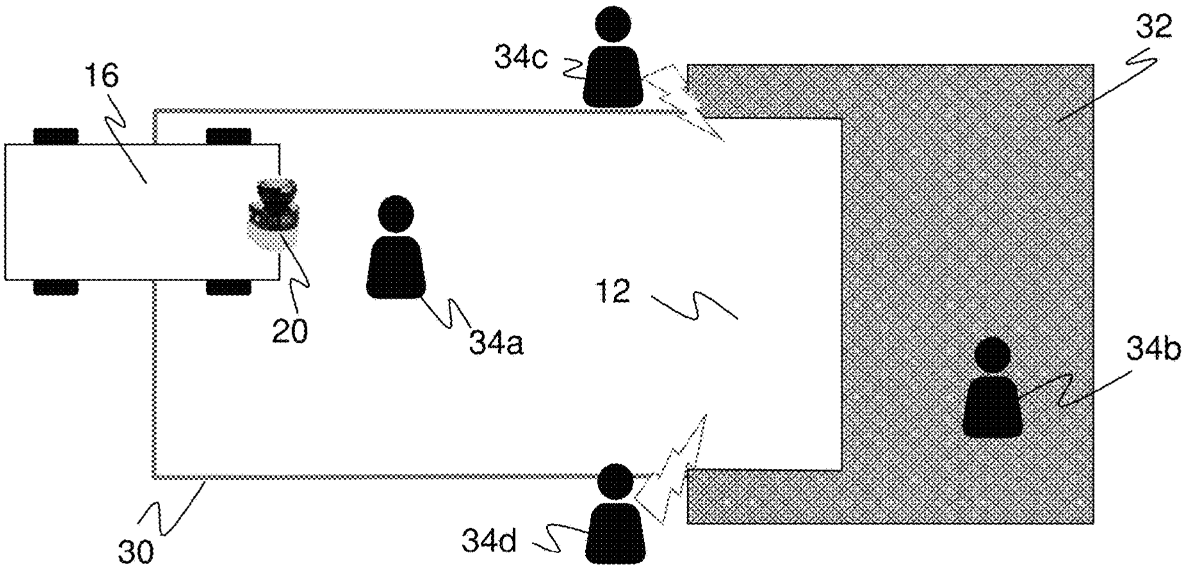
Figure 3:
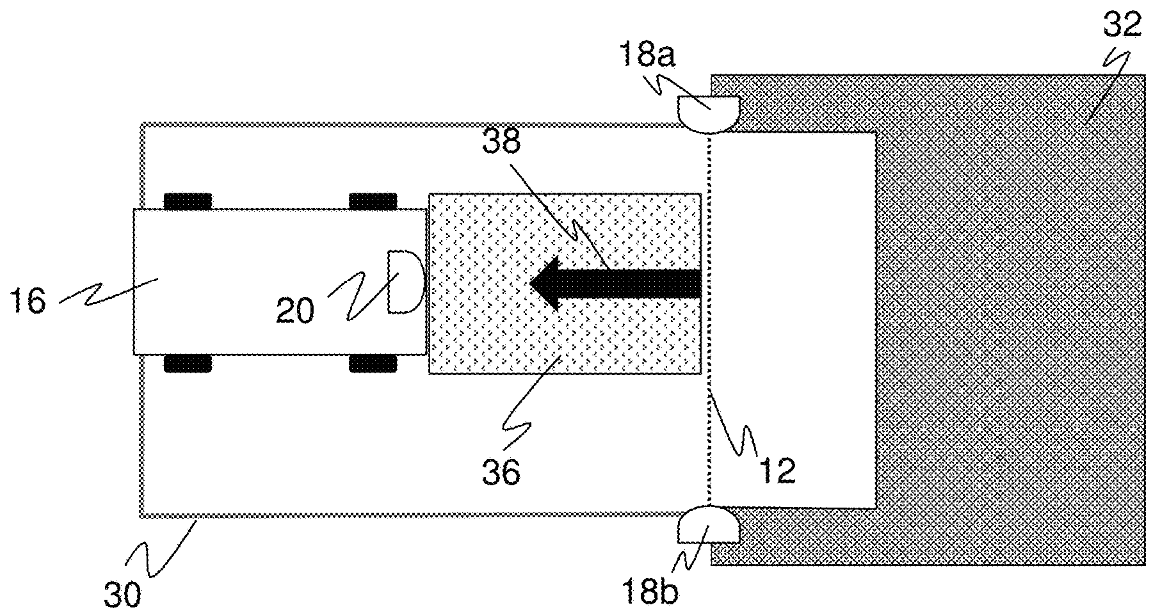
Figure 4:
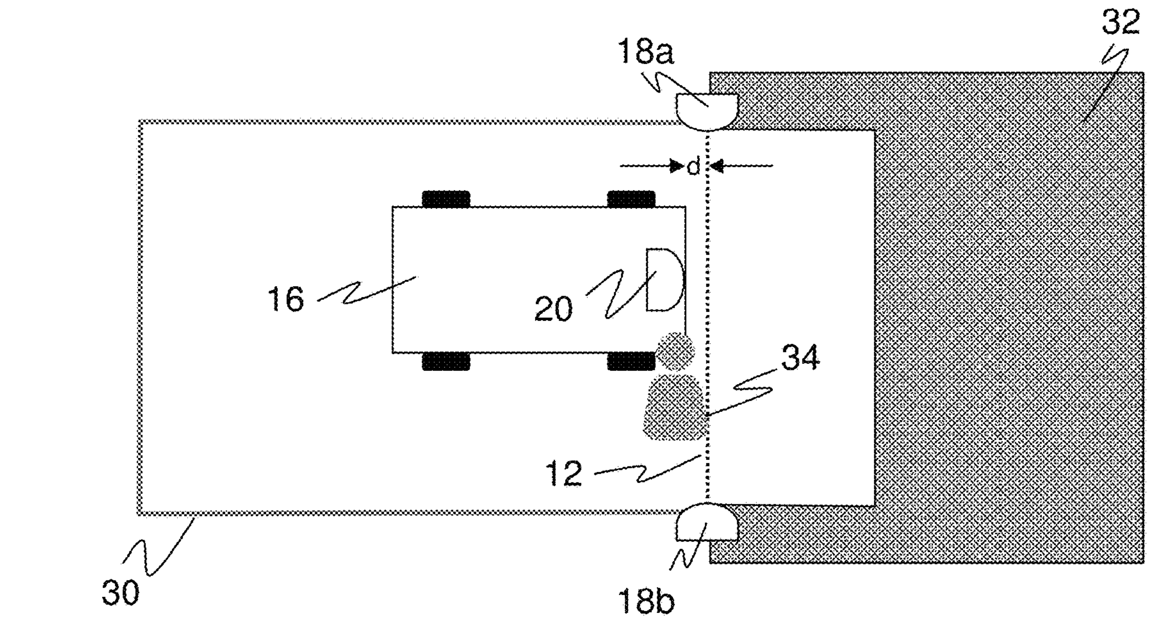
Figure 5:
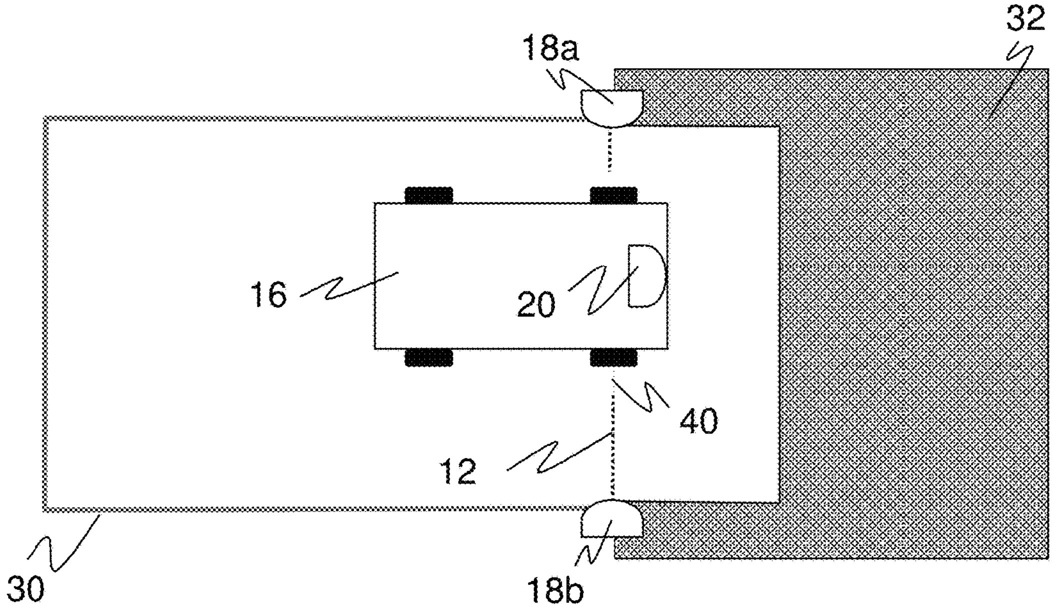
Figure 6:
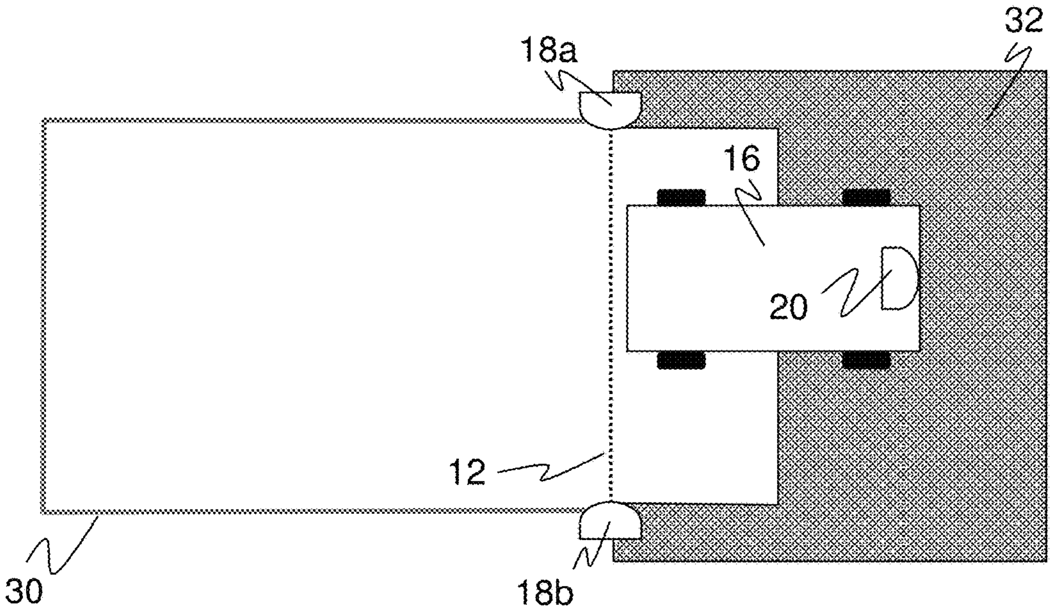
Figure 7:
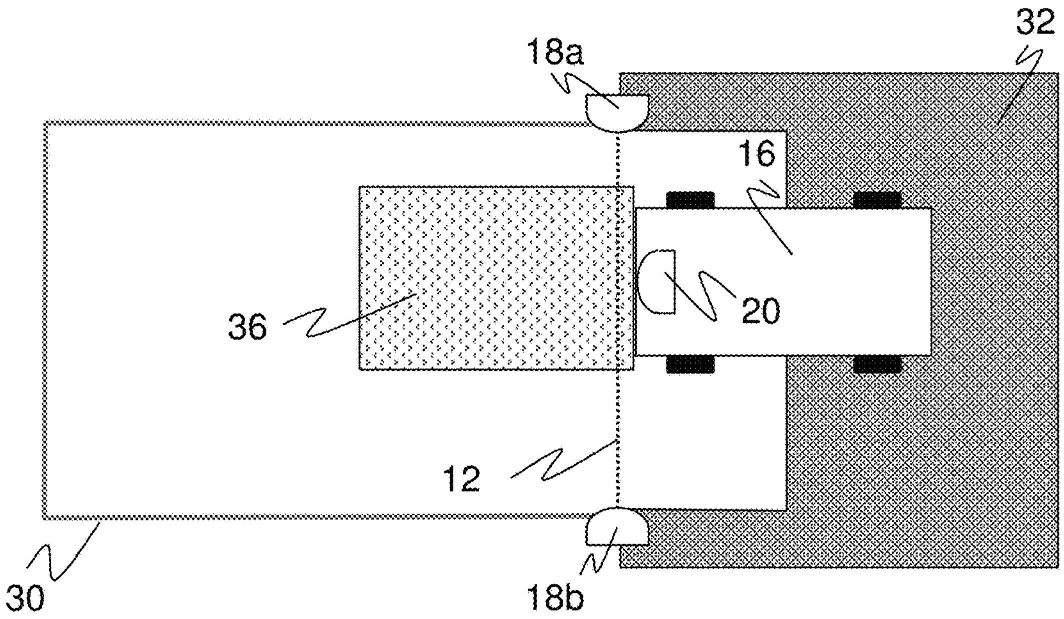
Figure 8:
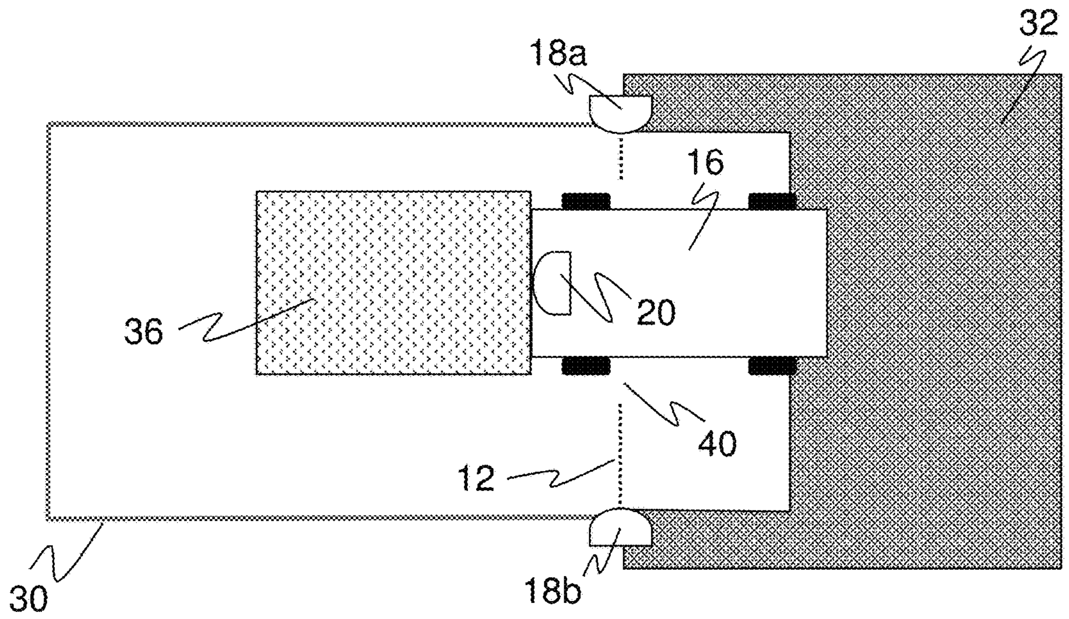
Figure 9:
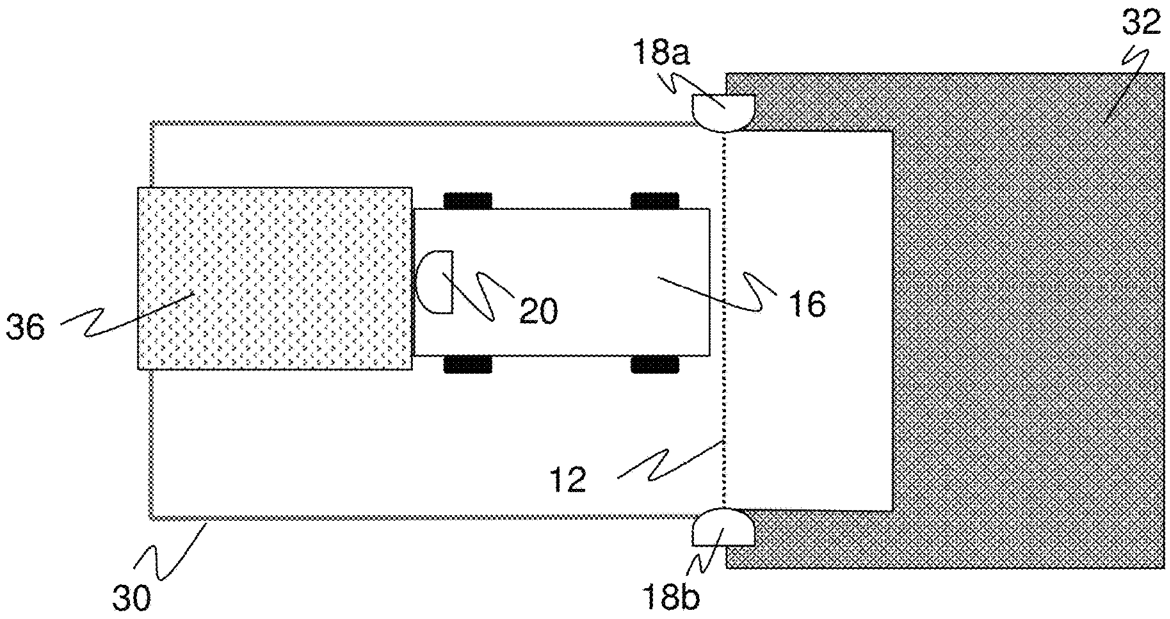

The invention will be explained in more detail in the following also with respect to further features and advantages by way of example with reference to embodiments and to the enclosed drawing. The Figures of the drawing show in:

FIG. 1 a schematic overview representation of a safeguarding system with a stationary safeguarding for an access zone and with a mobile safeguarding of a loading vehicle;

FIG. 2 a schematic plan view of a loading zone with possible dangers to persons by a loading vehicle;

FIG. 3 a schematic plan view of a loading zone on an approach of a loading vehicle driving in to a safeguarded access zone;

FIG. 4 a schematic plane view of the loading zone in which the loading vehicle driving in has reached a first position close to the safeguarded access zone;

FIG. 5 a schematic plan view of the loading zone in which the loading vehicle driving in is located in a drive-through corridor through the safeguarded access zone;

FIG. 6 a schematic plan view of the loading zone after the loading vehicle driving in has driven to a second position closely behind the safeguarded access zone and the drive-through corridor has been closed again;

FIG. 7 a schematic plan view of the loading zone in which the loading vehicle has reached the second position close to the safeguarded access zone again on driving out of the loading space;

FIG. 8 a schematic plan view of the loading zone in which the loading vehicle driving out is located in the drive-through corridor through the safeguarded access zone; and FIG. 9 a schematic plan view of the loading zone in which the loading vehicle driving out has driven to the first position again outside and close to the safeguarded access zone and the drive-through corridor has been closed again.

FIG. 1 shows a schematic overview representation of a safeguarding system for a loading/unloading procedure having a stationary safeguarding system 10 of an access zone 12 and a mobile safeguarding system 14 of a loading vehicle 16. The loading vehicle 16 is preferably an autonomous vehicle such as an AGV (automated guided vehicle) or an AMR (autonomous mobile robot) and is able to pick up and place down load objects and so to convey them from one location to another location.

The stationary safeguarding system 10 has at least one sensor, preferably a safe sensor 18*a-b*, with two respective sensors 18*a-b* being used by way of example at both sides of the access zone 12 in the Figures. The mobile safeguarding system 14 likewise has at least one sensor, preferably a safe sensor 20, with only one sensor 20 being provided by way of example in the Figures, but with at least one further sensor being able to be added for a redundant, a rear, and/or a side monitoring. The sensors 18*a-b* and 20 work in accordance with an electrosensitive sensor principle, preferably in accordance with an optical sensor principle as with a light grid, a laser scanner, a LiDAR sensor, a camera, or a 3D camera, in particular a time of flight camera, but also in accordance with non-optical sensor principles as with a radar or a radio location system, in particular an ultrabroadband system, as is described in EP 3 859 382 A1 described in the introduction. The sensors 18*a-b* and 20 can be selected as desired from the named and from further electrosensitive sensors, with some sensors not being equally suitable for both safeguarding systems 10, 14, for example a light grid only for the stationary safeguarding system 10. The invention will be described in the following by way of example with laser scanners. The object recognition is here based on a protected field concept; this is also by way of example since it is only a matter of detecting objects in the access zone 12 or in the respective travel path of the loading vehicle 16 in a safe manner.

A respective control and evaluation unit 22, 24 is provided in the stationary safeguarding system 10 and in the mobile safeguarding system 14. The control and evaluation unit functionality with the method subsequently described can practically be distributed as desired over the two control and evaluation units 22 24 and also over at least one external control and evaluation unit of a superior system. However, at least the respective object detection or protected field evaluation preferably takes place close to or in the associated sensor 18*a-b*, 20. Any desired processing units can be considered as the hardware of the control and evaluation unit 22, 24; for instance, digital processing modules such as a microprocessor or a CPU (central processing unit), an FPGA (field programmable gate array), a DSP (digital signal processor), an ASIC (application specific integrated circuit), an AI processor, an NPU (neural processing unit), a GPU (graphics processing unit), or the like. An external processing unit can be a computer of any desired kind, including notebooks, smartphones, tablets, a (safety) controller, equally a local network, an edge device, or a cloud. Safety related parts of the control and evaluation are preferably carried out on safe hardware or reach a required safety level by other measures such as redundancy or tests.

A respective communication interface 26, 28 is furthermore provided in the stationary safeguarding system 10 and in the mobile safeguarding system 14. The stationary safeguarding system 10 and the mobile safeguarding system 14 are hereby preferably wirelessly connected to one another to exchange data, information, and control signals. The communication connections can be implemented over any desired protocol such as Bluetooth, wireless LAN, WiFi, 3G/4G/5G, and in principle any other protocol.

The stationary safeguarding system 10 implements the safety function of access safeguarding. It is therefore recognized if an object is present in the access zones 12 and in particular if a person attempts to run through it. There is the possibility here of keeping certain parts of the safeguarded access zone 12 free to thus provide a drive-through corridor in which the safety function is bridged or muted. It can be implemented by switching over to a protected field having a free zone.

The mobile safeguarding system 14 implements the safety function of collision avoidance of the loading vehicle 16. Safety distances are thereby observed and objects or persons do not come into direct contact or at most come into a non-consequential contact with the loading vehicle 16 at a minimal, safe speed of the loading vehicle 16.

If an unauthorized object is detected in the access zone 12 or in front of the loading vehicle 16, this triggers a safety response of the loading vehicle 16 to avoid dangers to persons. The mobile safeguarding system 14 reacts to an object in front of the loading vehicle 16 in a safety related manner as part of its own collision avoidance. A safety related situation due to an object in the access zone 12 is reported to the mobile safeguarding system 14 by the stationary safeguarding system 10 over the communication interfaces 26, 28. As the respective safety response, the loading vehicle 16 is stopped, it carries out an evasion movement or reduces its speed such that a collision with a person becomes extremely unlikely and can at least not seriously endanger his health. The safety response can differ depending on whether it has been triggered by the collision avoidance or the access safeguarding.

A safe localization system of the loading vehicle 16 is preferably additionally implemented by the mobile safeguarding system 14 and/or a further sensor system, not shown. A map can be additionally stored in the control and evaluation unit 24 for this purpose. It is also possible to attach optical or physical markers in the environment of the loading/unloading zone. Using the localization system, the loading vehicle 16 in particular recognizes that it is in a safety related zone and no longer, for example, in a blocked logistics zone inaccessible to persons so that the mobile safeguarding system 14 has to be switched active. Relevant positions, still to be described, can moreover be recognized during the loading/unloading. Some few positions that can, for example, be safe points of interest in accordance with DE 10 2019 128 782 A1 named in the introduction are sufficient for the implementation of the method in accordance with the invention.

FIG. 1 shows a stationary safeguarding system 10 in a 1:1 association with a mobile safeguarding system 14. This is an exemplary simplification. One or more stationary safeguarding systems 10 having one or more mobile safeguarding systems 14 can work together or corresponding connections can be established or released depending on the location and the task of the loading vehicle 16.

FIG. 2 shows a schematic plan view of a loading zone or of a loading/unloading zone. The loading zone comprises a loading dock 30 and a loading space 32 of which only the front part is shown. The loading dock 30 forms a safety related zone ("confined zone") because persons may dwell here. To avoid possible risks to the persons, the loading vehicle 16 therefore has to activate its mobile safeguarding system 14 that is here shown in simplified form and as representative only by a laser scanner as the sensor 20. FIG. 2 shows some possible dangers due to a person 34*a* on the loading dock, a person 34*b* in the loading space 32, or a laterally located person 34*c-d* whose arm could in particular be crushed. The mobile safeguarding system 14 is admittedly able to recognize all these persons 34*a-d* in good time and to initiate a corresponding safety response. The problem is that due to the tightly packed and unknown load objects a decision can above all practically not be made within the loading space 32 as to whether a person 34*b* is there. The loading vehicle 16 has to initiate its safety response as a precaution and is thus as good as not available. On the other hand, the mobile safeguarding system 14 cannot be simply deactivated because then the safety in the shown positions and in further positions of persons 34*a-d* would not be ensured.

The method in accordance with the invention of loading or unloading the loading space 32 will now be explained with reference to FIGS. 3 to 9. All the described steps of the particularly preferred overall concept do not necessarily have to be carried out here. The loading space 32 is by way of example the trailer of a truck.

The invention can, however, also be used for a different loading space 32 having a different ante-zone than the loading dock 30.

FIG. 3 shows a schematic plan view of the loading zone with a loading dock 30 and a loading space 32 on an approach of a loading vehicle 16 driving in. The loading space 32 is closed at all sides, with the exception of the access zone 12, via which the loading space 32 can be driven to from the loading dock 30. The stationary safeguarding system 10 monitors the access zone 12 so that no object and no person moves into the loading space 32 unnoticed. Only two oppositely disposed laser scanners are shown as sensors 18*a-b* of the stationary safeguarding system 10 in a simplified and representative form here; the mobile safeguarding system 14 of the laser loading vehicle 16 is still represented by the sensor 20 that monitors a protected field 36 in the direction of travel.

At the start of a loading/unloading procedure, the trailer having the loading space 32 is docked at the loading dock and the operator of the truck or a member of the logistics staff opens the trailer and thus makes the loading space 32 accessible via the access zone 12. A manual check that no person is in the loading space 32 follows by a visual check or by calling and the like. The stationary safeguarding system 10 is then switched active via a button, for example. Such a manual release procedure or (re-)start procedure for the putting into operation is typical for technical safety applications. After the activation, the stationary safeguarding system ensures that no access takes place and the loading space 32 remains free of persons.

When the loading vehicle 16 approaches the loading dock 30, it preferably recognizes by means of its localization system that it is now in a safety related zone and it thereupon activates its mobile safeguarding system 14 or the protected field 36. Alternatively, the protected field 36 can always be active during the travel of the loading vehicle 16, with the exception of the still to be explained movements in the loading space 32. The loading vehicle 16 or its mobile safeguarding system 14 builds up a communication connection with the stationary safeguarding system 10. It queries whether the access safeguarding is ready for operation, i.e. if no access has previously taken place and accordingly no person can be present in the loading space 32. The protected field 36 can, as indicated by the arrow 38, be successively shortened during the approach of the loading vehicle 16 to the safeguarded access zone 12. A monitoring into the loading space 32 is not necessary since the stationary safeguarding system 10 prevents access so that a protected field 36 projecting into the loading space 32 cannot anyway detect any person, but a false triggering of the safety response by an object in the loading space 32 is still very much possible.

FIG. 4 shows a schematic plan view of the loading zone in which the loading vehicle 16 driving in has reached a first position close to the safeguarded access zone 12. In the first position, the distance d between the loading vehicle 16 and the safeguarded access zone 12 is no longer sufficient for a person 34, indicated hatched, would fit therebetween. The distance d is, for example, 20 cm or even less, but even with a somewhat larger distance d such as 30 cm, 50 cm, or 70 cm, a person will not be able to push between the loading vehicle 16 and the safeguarded access zone 12 without being noticed by the stationary safeguarding system 10. The loading vehicle 16 in particular recognizes the reaching of the first position by a safe localization system.

In the first position, the mobile safeguarding system 14 prompts the release of a drive-through corridor at the stationary safeguarding system. A corresponding section of the safeguarded access zone 12 should therefore be muted or a switch to a protected field configuration should be made that releases the drive in corridor. Where necessary, because the drive-through corridor cannot be configured fast enough, the loading vehicle 16 stops temporarily. The mobile safeguarding system 14 is preferably switched to inactive from now on since anyway a person cannot be in front of the loading vehicle 16 and thus behind the safeguarded access zone 12 in the loading space 32.

FIG. 5 shows a schematic plan view of the loading zone in which the loading vehicle 16 driving in is located in the released or muted drive-through corridor 40 of the safeguarded access zone 12. Laterally, i.e. in a dimension transversely to the direction of travel, the location of the drive-through corridor 40 is either dynamically adapted to the lateral position of the loading vehicle 16 or the loading vehicle 16 is driven to a first position with a fixed lateral position so that the lateral position of a fixed drive-through corridor 40 matches the lateral position of the loading vehicle 16. The direction of travel in the Figures is from left to right by way of example on the driving in; accordingly, the lateral position corresponds to the vertical location in the representation. An exchange of signals preferably takes place during the driving through between the mobile safeguarding system 14 and the stationary safeguarding system 10 to keep the drive-through corridor 40 open.

FIG. 6 shows a schematic plan view of the loading zone after the loading vehicle 16 driving in has driven to a second position close behind the safeguarded access zone 12. In the second position, analogously to the first position, there is now too little room between the loading vehicle 16, now its rear end, and the safeguarded access zone 12 for a person 34 to fit in. The drive-through corridor 40 is now closed again once the mobile safeguarding system 14 has determined the arrival at the second position and has reported to the stationary safeguarding system 10 that the muting is no longer required. The safeguarded access zone 12 is thus no longer penetrable. The loading vehicle 16 can now move freely in the loading space 32 with a still inactive mobile safeguarding system 14 and can move load objects there, can in particular place down its taken along load there or can pick up a new load.

FIG. 7 shows a schematic plan view of the loading zone in which the loading vehicle 16 would again want to depart from the loading zone 32 after completing the work and has again reached the second position close to the safeguarded access zone 12 on driving out of the loading space 32. Since it is the return journey, it is again the front end of the loading vehicle 16 that is decisive. In another respect, the loading vehicle 16 can also drive in reverse instead of turning in the loading space 32; the rear end of the loading vehicle 16 is then still decisive and the mobile safeguarding system 14 has to safeguard the reverse driving, which is not further distinguished here.

Analogously to the driving in to the first position, the mobile safeguarding system 14 requires the release of the drive-through corridor 40 from the stationary safeguarding system 10 at the second position on the driving out and the loading vehicle 16 is stopped where necessary until an acknowledgment of the configuration of the drive-through corridor 40 has taken place. The mobile safeguarding system 14 now at the latest switches its collision protection or the protected field 36 active again since a person may be present in front of the safeguarded access zone 12. The activation can also already take place a little earlier depending on the speed at which the loading vehicle 16 moves. If, for example, it anyway first stops according to plan at the second position to configure the drive-through corridor 40, an earlier activation is unnecessary.

FIG. 8 shows a schematic plan view of the loading zone in which the loading vehicle 16 driving out is located in the drive-through corridor 40 through the safeguarded access zone 12. An exchange of signals again preferably takes place between the mobile safeguarding system 14 and the stationary safeguarding system 10 during the driving through to keep the drive-through corridor 40 open during the driving through.

FIG. 9 shows a schematic plan view of the loading zone in which the vehicle 16 driving out has reached the first position outside the loading space 32 and close to the safeguarded access zone 12 after the driving through. The mobile safeguarding system 14 signals to the stationary safeguarding system 10 that the access zone 12 can be closed again. As soon as this has been done, the stationary safeguarding system 10 again safeguards on its own that no persons move into the loading space 32 unnoticed. The loading vehicle 16 can continue to move on the loading dock 30 under the sole responsibility of its mobile safeguarding system 14 and can, for example, collect the next load object or can place down a load object taken along from the loading space 32 at a location provided for this purpose, for example at the margin of the loading dock 30 or in a logistics hall.

As long as the drive-through corridor 40 is open, and this applies on the driving out as already before on the driving in, the loading vehicle 16 physically prevents an unnoticed penetration of a person, who would inevitably be noticed by the non-muted portion of the safeguarded access zone 12, due to the dimensions of the drive-through corridor 40 adapted to the loading vehicle 16 and due to the first position and second position disposed close to the safeguarded access zone 12.

If the stationary safeguarding system 10 recognizes an object in the safeguarded access zone 12 at any point in time, the loading vehicle 16 may no longer drive into the loading space 32 until the stationary safeguarding system 10 has again been released, which as a rule requires a manual check of the loading space 32. Under certain circumstances, the stationary safeguarding system 10 can still differentiate a direction of movement and can nevertheless tolerate an object partially moving in, but then moving out again. An object only moving out indicates that the initial release was defective; that may therefore not occur and a general appraisal should take place here as required. If the loading vehicle 16 is already in the loading space 32 when the safeguarded access zone is infringed, the loading vehicle 16 has to stop or has to depart from the loading space 32 at a very slow safe speed or with an active collision avoidance function.

The invention claimed is:

1. A method of loading and/or unloading a loading space, comprising:

driving a loading vehicle into the loading space, wherein the loading vehicle first drives to a first position located such that a distance from the first position to a safeguarded access zone is insufficient to fit a person between the loading vehicle and the safeguarded access zone, wherein the safeguarded access zone of the loading space is safeguarded by at least one first sensor, wherein the loading vehicle is safeguarded by at least one second sensor, and wherein the at least one first sensor is configured to recognize a presence of an object in the safeguarded access zone and/or the at least one second sensor is configured to recognize the presence of the object in front of the loading vehicle;

muting a portion of monitoring of the safeguarded access zone by the at least one first sensor to open a drive-through corridor into the safeguarded access zone upon the loading vehicle reaching the first position, the drive-through corridor being temporarily unmonitored by the at least one first sensor;

driving the loading vehicle through the drive-through corridor and into the safeguarded access zone; and placing down and/or collecting at least one load object.

2. The method in accordance with claim 1, wherein the loading space is a loading space of a transport vehicle.

3. The method in accordance with claim 1, wherein a safety response of the loading vehicle is initiated on recognition of the presence of an object.

4. The method in accordance with claim 1, wherein the loading space is a semi-trailer or a trailer of a commercial vehicle or truck and/or the safeguarded access zone is arranged at a loading dock.

5. The method in accordance with claim 1, wherein the loading vehicle drives through the drive-through corridor into a second position that is located so close to the safeguarded access zone that no person fits between the loading vehicle and the safeguarded access zone and the drive-through corridor is then closed and the safeguarding of the safeguarded access zone by the at least one first sensor is thus again fully activated.

6. The method in accordance with claim 1, wherein the loading vehicle first drives to the second position on driving out of the loading space and the safeguarding of the safeguarded access zone by the at least one first sensor is then adapted such that the drive-through corridor is created for the loading vehicle.

7. The method in accordance with claim 6, wherein the loading vehicle drives through the drive-through corridor to the first position and the drive-through corridor is then closed and the safeguarding of the safeguarded access zone by the at least one first sensor is thus fully activated again.

8. The method in accordance with claim 1, wherein a lateral position of the drive-through corridor is adapted to a lateral position of the loading vehicle.

9. The method in accordance with claim 1, wherein the safeguarding of the loading vehicle by the at least one second sensor is inactive during the movement in the loading space.

10. The method in accordance with claim 9, wherein the safeguarding of the loading vehicle by the at least one second sensor is inactive on the driving into the loading space at the earliest from the first position onward and being switched active again on the driving out of the loading space at the latest up to the second position.

11. The method in accordance with claim 10, wherein the at least one first sensor and/or the at least one second sensor is one of the following: a single layer or multilayer laser scanner, a LiDAR sensor, a 3D camera, a time of flight camera, a radar, or a radio location system.

12. The method in accordance with claim 1, wherein the loading vehicle recognized when it moves in a safety related zone in front of the safeguarded access zone and then at the latest switches the safeguarding by the second sensor active.

13. The method in accordance with claim 1, wherein a cross-section of the drive-through corridor corresponds to a cross-section of the loading vehicle at least except for a buffer zone smaller than the person.

14. The method in accordance with claim 1, wherein a stationary safeguarding system of the safeguarded access zone having the at least one first sensor and a mobile safeguarding systems of the loading vehicle having the at least one second sensor are in a communication connection with one another.

15. The method in accordance with claim 14, wherein the stationary safeguarding system of the access and the mobile safeguarding systems of the loading vehicle are in a communication connection with one another so that the loading vehicle requests an opening and closing of the drive-through corridor and/or to communicate the presence of the object in the safeguarded access zone to the loading vehicle.

16. The method in accordance with claim 1, wherein the at least one first sensor monitors an upright protected field to safeguard the safeguarded access zone and/or the at least one second sensor monitors a protected field in the direction of travel to safeguard the loading vehicle.

17. The method in accordance with claim 16, wherein the upright protected field is a vertical protected field.

18. The method in accordance with claim 16, wherein the protected field in the direction of travel is a horizontal protected field.

19. The method in accordance with claim 16, wherein the protected field of the at least one second sensor is successively shortened on an approach to the safeguarded access zone.

20. The method in accordance with claim 1, wherein the loading vehicle is safely localized, at least in the first position and/or in the second position.

21. A safeguarding system for the loading and/or unloading of a loading space by a loading vehicle, comprising:

a stationary sensor system for safeguarding an access zone of the loading space;

a mobile sensor system for safeguarding the loading vehicle; and a control and evaluation unit in communication with the stationary sensor system and the mobile sensor system, wherein the control and evaluation unit is configured to:

detect the loading vehicle driving to a first position located such that a distance from the first position to the access zone is insufficient to fit a person between the loading vehicle and the access zone; and mute a portion of monitoring of the access zone by the stationary sensor system to open a drive-through corridor into the access zone upon the loading vehicle reaching the first position, the drive-through corridor being temporarily unmonitored by the stationary sensor system, wherein the stationary sensor system is configured to recognize a presence of an object in the safeguarded access zone and/or the mobile sensor system is configured to recognize the presence of the object in front of the loading vehicle.

* * * * *